US011928292B2

(12) United States Patent
Kobayashi

(10) Patent No.: US 11,928,292 B2
(45) Date of Patent: Mar. 12, 2024

(54) TOUCHSCREEN DEVICE

(71) Applicant: DMG MORI CO., LTD., Nara (JP)

(72) Inventor: Hiroshi Kobayashi, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 17/799,011

(22) PCT Filed: Oct. 15, 2020

(86) PCT No.: PCT/JP2020/038887
§ 371 (c)(1),
(2) Date: Aug. 11, 2022

(87) PCT Pub. No.: WO2021/161585
PCT Pub. Date: Aug. 19, 2021

(65) Prior Publication Data
US 2023/0065893 A1 Mar. 2, 2023

(30) Foreign Application Priority Data
Feb. 13, 2020 (JP) .................................. 2020-022272

(51) Int. Cl.
G06F 3/044 (2006.01)
(52) U.S. Cl.
CPC .... G06F 3/044 (2013.01); *G06F 2203/04105* (2013.01)
(58) Field of Classification Search
CPC ................. G06F 3/0446; G06F 3/044; G06F 2203/04105; G06F 2200/1612; G06F 1/1643; G06F 1/1601
See application file for complete search history.

(56) References Cited

U.S. PATENT DOCUMENTS

2012/0098767 A1* 4/2012 Takai .................. G06F 3/04142
345/173
2012/0162087 A1* 6/2012 Hou ...................... G06F 1/1626
345/173

(Continued)

FOREIGN PATENT DOCUMENTS

| JP | 2012-177960 A | 9/2012 |
| JP | 2015-38689 A | 2/2015 |
| JP | 2016-207128 A | 12/2016 |

OTHER PUBLICATIONS

International Search Report for related Application No. PCT/JP2020/038887; report dated Dec. 22, 2020.

*Primary Examiner* — Hong Zhou
(74) *Attorney, Agent, or Firm* — von Briesen & Roper, s.c.

(57) ABSTRACT

A touchscreen device includes a touchscreen (2), support parts (6a, 6b, 6c, 6d) supporting a periphery of the touchscreen (2), and an information output unit outputting information corresponding to an external force acting on the touchscreen (2). Each support part (6a, 6b, 6c, 6d) has thereon a pressure sensor (10a, 10b, 10c, 10d) arranged such that a pressure sensing surface thereof is in contact with the periphery of the touchscreen (2) and has a predetermined angle with respect to a planar surface of the touchscreen (2). The information output unit is configured to recognize, based on detected values detected by the pressure sensors (10a, 10b, 10c, 10d), an acting direction along the planer surface of the touchscreen (2) of the external force acting on the touchscreen (2) and output, to the outside, information on the acting direction and positional information detected by the touchscreen (2) for a position on the touchscreen where the external force is acting.

6 Claims, 3 Drawing Sheets

(56) References Cited

U.S. PATENT DOCUMENTS

| | | | | |
|---|---|---|---|---|
| 2012/0262396 A1* | 10/2012 | Jiyama | ............... | G06F 3/04142 |
| | | | | 345/173 |
| 2013/0069861 A1* | 3/2013 | Lee | ................... | G06F 3/03548 |
| | | | | 345/156 |
| 2013/0241865 A1* | 9/2013 | Lin | ................... | G06F 3/04166 |
| | | | | 345/174 |
| 2015/0309576 A1* | 10/2015 | Tissot | .................. | G06F 3/0414 |
| | | | | 345/174 |
| 2022/0412824 A1* | 12/2022 | Patel | .................. | A61B 5/7264 |

\* cited by examiner

TOUCHSCREEN DEVICE

TECHNICAL FIELD

The present invention relates to a touchscreen device having a touchscreen with a screen display function and an input function for inputting operational information.

BACKGROUND ART

A touchscreen as described above is conventionally applied to various devices and instruments and used as a display device for displaying information and an input device for inputting operational information. A known example of such a touchscreen is disclosed in Japanese Unexamined Patent Application Publication No. 2012-177960.

This touchscreen is configured to be able to measure a position of a touching force acting on a screen and a load of the touching force based on the touching force applied to the screen. This touchscreen has an elastic plate having a rectangular shape in plan view and serving as the screen, legs equally attached to the four corners of the back surface of the elastic plate, and four strain sensors each provided at a position close to the corresponding leg between the diagonal legs on the back surface of the elastic plate. The strain sensors are arranged such that the diagonal lines thereof overlap with the diagonal lines of the elastic plate and the distances between each strain sensor and the corresponding leg are equal to each other.

In this touchscreen, when a load is applied to the elastic plate, the elastic plate elastically deforms in accordance with the load and this elastic deformation is detected by the strain sensors. That is to say, a voltage signal of a magnitude corresponding to the deformation is output from each strain sensor, and the position and magnitude of the load acting on the elastic plate are calculated based on the voltage signals output from the strain sensors and theoretically predetermined calculation equations.

CITATION LIST

Patent Literature

Patent Literature 1: Japanese Unexamined Patent Application Publication No. 2012-177960

SUMMARY OF INVENTION

Technical Problem

In recent years, a touchscreen as described above is used in various applications. In terms of the operational information input function of the touchscreen, it would be convenient if it is possible to input more various types of information through the touchscreen.

The above-described conventional touchscreen is capable of detecting the position and magnitude of a load acting vertically on the elastic plate, which is however not always sufficient in terms of the ability to input various types of information.

For example, if it is possible to move an image of a movable object displayed on the touchscreen by first softly touching (pressing) the image to be moved with a finger or the like to bring the image into a movable state and then strongly pressing the finger in a desired direction to move the image in the pressing direction, images displayed on the touchscreen can be manipulated variously, which is convenient.

However, the above-described conventional touchscreen is capable of detecting the position and magnitude of a load acting vertically on the elastic plate but is not capable of detecting a load acting in a direction oblique to the elastic plate or in a direction along the surface of the elastic plate on the elastic plate.

The present invention has been achieved in view of the above-described circumstances, and an object of the invention is to provide a touchscreen device which is capable of detecting a pressing force acting in a direction oblique to a screen or in a direction along the screen surface on the screen.

Solution to Problem

To solve the above-described problem, the present invention provides a touchscreen device including:
  a touchscreen having a plate shape;
  support parts supporting at least three points of a periphery of the touchscreen; and
  an information output unit outputting, to outside, information corresponding to an external force acting on the touchscreen,
  each of the support parts having a pressure sensor arranged such that a sensing surface for pressure detection thereof is in contact with the periphery of the touchscreen and the sensing surface thereof is inclined at a predetermined angle with respect to a planar surface of the touchscreen,
  the information output unit being configured to recognize, based on detected values detected by the pressure sensors, an acting direction along the planer surface of the touchscreen of the external force acting on the touchscreen and output, to the outside, information on the acting direction and positional information detected by the touchscreen for a position on the touchscreen where the external force is acting.

In this touchscreen device, at least three points of the periphery of the touchscreen are supported by the support parts that each have the pressure sensor thereon. The pressure sensor is arranged such that the sensing surface for pressure detection thereof is in contact with the periphery of the touchscreen and the sensing surface thereof is inclined at a predetermined angle with respect to the planar surface of the touchscreen.

The touchscreen may comprise any suitable conventionally known device, such as a touchscreen, a touch key, or the like. The touchscreen detects the touchscreen being touched by an operator and detects the position of the touching.

Since the support parts supporting the touchscreen each have the pressure sensor thereon that is arranged such that the sensing surface thereof is inclined at a predetermined angle with respect to the planar surface of the touchscreen, when the touchscreen is touched and pressed down by an operator, the pressure sensors are pressed down by the touchscreen being pressed down, whereby the pressing of the touchscreen by the operator is detected by the pressure sensors.

Further, also when the touchscreen is pressed in a direction oblique to the planar surface of the touchscreen or in a direction along the planar surface of the touchscreen by an operator, the pressing is detected by the pressure sensors in the same manner. The direction of the pressing can be recognized, for example, by comparing force components along the planar surface of the touchscreen of pressure values detected by the pressure sensors.

Thus, in this touchscreen device, when the touchscreen is touched by an operator, the touching is detected by the touchscreen and the pressure sensors and simultaneously the position of the touching is detected by the touchscreen. Further, when the touchscreen is pressed in a direction oblique to the planar surface of the touchscreen or in a direction along the planar surface of the touchscreen by the operator, the pressing is detected by the pressure sensors.

Thus, this touchscreen device is capable of not only detecting a pressing force acting vertically on the touchscreen but also detecting a pressing force acting in a direction oblique to the planar surface of the touchscreen or in a direction along the planar surface of the touchscreen on the touchscreen. Therefore, for example, it is possible to move an image of a movable object displayed on the touchscreen by first softly touching (pressing) the image to be moved with a finger or the like to bring the image into a movable state and then strongly pressing the finger in a desired direction to move the image in the pressing direction. Thus, it is possible to variously manipulate images displayed on the touchscreen.

This touchscreen device may have a configuration in which the touchscreen has a rectangular shape and the support parts are configured to respectively support the four sides of the periphery of the touchscreen or configured to respectively support the four corners of the periphery of the touchscreen.

Further, it is preferred that the pressure sensors are each arranged such that the sensing surface thereof is in contact with the touchscreen at an angle of 45° with respect to the planar surface of the touchscreen. This configuration enables both a pressing force acting vertically on the touchscreen and a pressing force acting in a direction oblique to the planar surface of the touchscreen or in a direction along the planar surface of the touchscreen to be accurately detected.

Advantageous Effects of Invention

As described above, in the touchscreen device according to the present invention, when the touchscreen is touched by an operator, the touching is detected by the touchscreen and the pressure sensors and simultaneously the position of the touching is detected by the touchscreen. Further, when the touchscreen is pressed in a direction oblique to the planar surface of the touchscreen or in a direction along the planar surface of the touchscreen by the operator, the pressing is detected by the pressure sensors.

Thus, the touchscreen device according to the present invention is capable of not only detecting a pressing force acting vertically on the touchscreen but also detecting a pressing force acting in a direction oblique to the planar surface of the touchscreen or in a direction along the planar surface of the touchscreen on the touchscreen. Therefore, it is possible to variously manipulate images displayed on the touchscreen.

DESCRIPTION OF EMBODIMENTS

Hereinafter, a specific embodiment of the present invention will be described with reference to the drawings.

Figure 1:
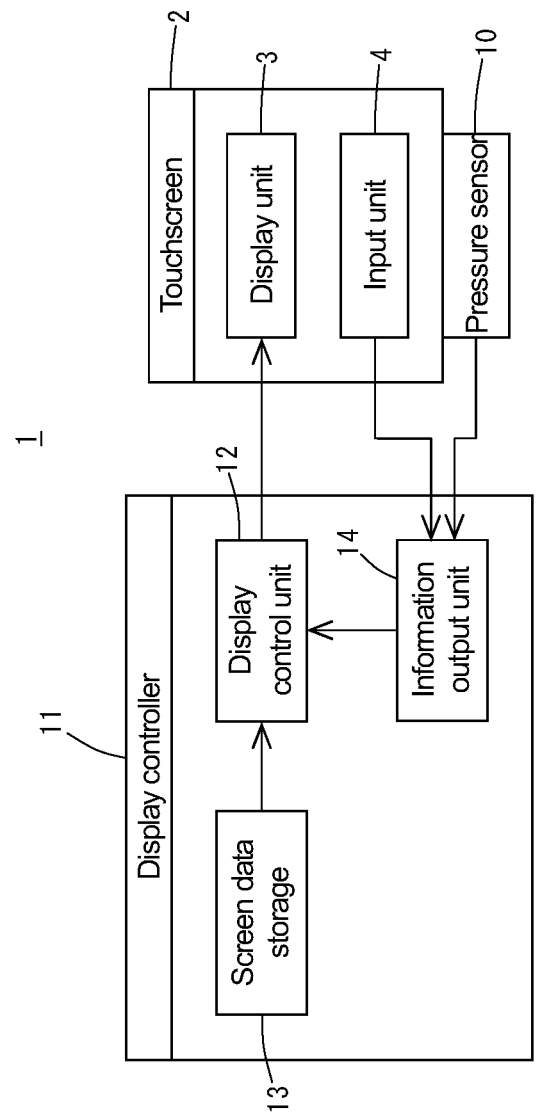
FIG. 1 is a block diagram illustrating a touchscreen device according to an embodiment of the present invention.
Figure 2:
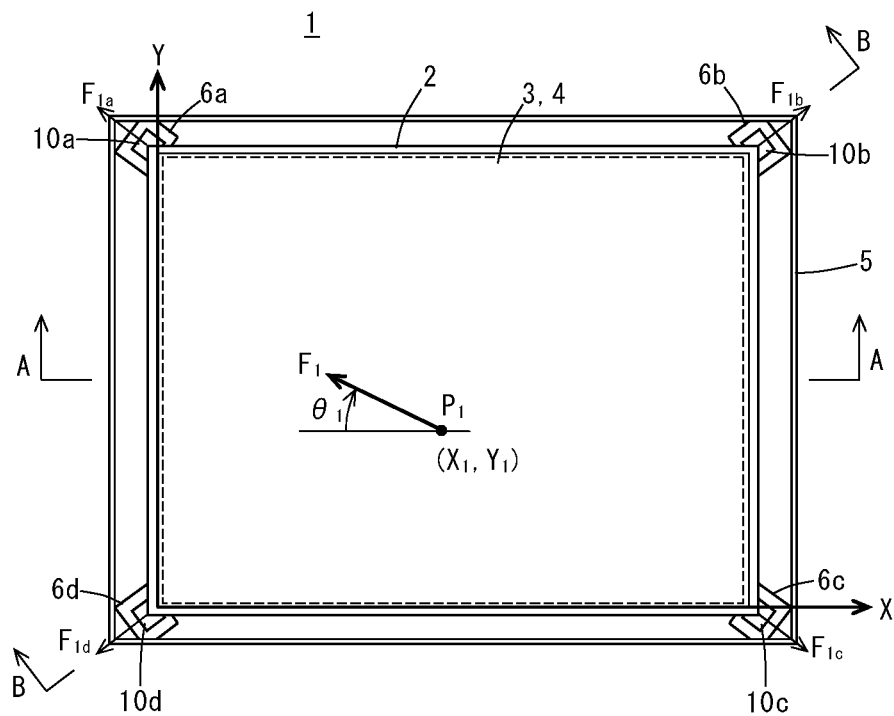
FIG. 2 is a plan view illustrating a touchscreen in the embodiment.

As illustrated in FIGS. 1 and 2, a touchscreen device 1 according to this embodiment is constituted by a touchscreen 2, a support frame 5 supporting the touchscreen 2, a display controller 11 controlling display on the touchscreen 2, and other components.

The touchscreen 2 has a rectangular shape in plan view. The touchscreen 2 has a display unit 3 for displaying information thereon and an input unit 4 superimposed on the display unit 3, and the display unit 3 is visible through the input unit 4 from the outside. By way of example, the input unit 4 can be of the self-capacitance detection type that has a plurality of electrodes arranged in a matrix pattern on a two-dimensional plane and is configured to output a signal corresponding to a capacitance produced between each electrode and the ground potential. In this case, a capacitance is produced between each electrode and the ground potential and a signal (e.g., a voltage signal) corresponding to the capacitance on each electrode is output.

The support frame 5 has a rectangular planar shape and is composed of a frame with upright edges and made of materials having an L-shaped cross section (angle bars). The support frame 5 holds the touchscreen 2 inside the frame.

Figure 3:
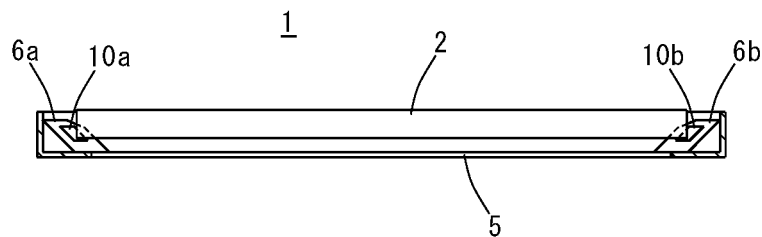
FIG. 3 is a sectional view taken along line A-A in FIG. 2.
Figure 4:
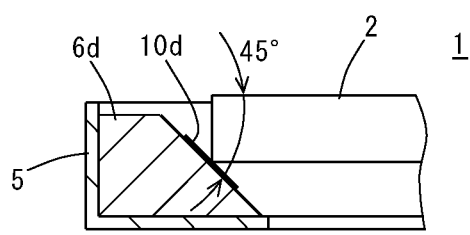
FIG. 4 is an enlarged view of a corner portion of a sectional view taken along line B-B in FIG. 2.

At the corners of the support frame 5, support members 6a, 6b, 6c, 6d are respectively provided. As illustrated in FIGS. 3 and 4, each support member 6a, 6b, 6c, 6d has an inclined surface and is fixed to the support frame 5 with the inclined surface facing inward. On the inclined surfaces of the support members 6a, 6b, 6c, 6d, pressure sensors 10a, 10b, 10c, 10d are respectively attached.

The touchscreen 2 is held by the support frame 5 with the four corners of the touchscreen 2 respectively in contact with the pressure sensors 10a, 10b, 10c, 10d. Note that the surface in contact with the touchscreen 2 of each pressure sensor 10a, 10b, 10c, 10d functions as a sensing surface. The inclined surfaces of the support members 6a, 6b, 6c, 6d as well as the pressure sensors 10a, 10b, 10c, 10d have an angle of 45° with respect to the top surface of the touchscreen 2.

The display controller 11 consists of a display control unit 12, a screen data storage 13, and an information output unit 14. The display controller 11 is composed of a computer including a CPU, a RAM, and a ROM. The display control unit 12 and the information output unit 14 are functionally implemented by a computer program so as to execute the processes described later. The screen data storage 13 is composed of an appropriate storage medium such as a RAM.

The information output unit 14 recognizes a position touched by an operator on the touchscreen 2 by receiving a signal transmitted from the input unit 4 of the touchscreen 2, and outputs the recognized position information to the display control unit 12. For example, in FIG. 2, in the case where a coordinate system having X-axis and Y-axis as reference axes is set on the input unit 4 where the electrodes are formed, if a position $P_1$ is touched by an operator, the information output unit 14 recognizes the coordinate ($X_1$, $Y_1$) of the position $P_1$ touched by the operator based on output from the input unit 4 and outputs the recognized coordinate data ($X_1$, $Y_1$) to the display control unit 12.

Further, the information output unit 14 recognizes an acting direction of a pressing force acting along the top surface of the touchscreen 2 on the touchscreen 2 and the magnitude of the pressing force by receiving detected values (pressure data) detected by the four pressure sensors 10a, 10b, 10c, 10d, and outputs the recognized pressing force information to the display control unit 12.

For example, the information output unit 14 calculates force components along the top surface of the touchscreen 2 on the pressure sensors 10a, 10b, 10c, 10d by processing the pressure data detected by the pressure sensors 10a, 10b, 10c, 10d, and estimates the acting direction and magnitude of the pressing force based on the calculated force component magnitudes.

More specifically, for example, if a pressing force $F_1$ acts in the direction indicated by the arrow at the position $P_1$ on the touchscreen 2 in FIG. 2, the largest of pressing forces along the top surface of the touchscreen 2 detected by the pressure sensors 10a, 10b, 10c, 10d will be the pressing force $F_{1a}$ detected by the pressure sensor 10a, followed in order by the pressing force $F_{1d}$ detected by the pressure sensor 10d, the pressing force $F_{1b}$ detected by the pressure sensor 10b, and the pressing force $F_{1c}$ detected by the pressure sensor 10c.

The information output unit 14 compares the pressing forces $F_{1a}$, $F_{1b}$, $F_{1c}$, $F_{1d}$, thereby recognizing the acting direction of the pressing force $F_1$. Further, the information output unit 14 recognizes the sum of the pressing forces $F_{1a}$, $F_{1b}$, $F_{1c}$, $F_{1d}$ as the pressing force $F_1$. Note that the acting direction of the pressing force $F_1$ can be defined by an angle $\theta_1$ with respect to the X-axis. The information output unit 14 outputs information on the recognized acting direction (angle $\theta_1$) and magnitude ($F_1$) of the pressing force $F_1$ to the display control unit 12.

The screen data storage 13 is a functional unit that stores data to be displayed on the display unit 3 of the touchscreen 2. The display control unit 12 is a processing unit that displays appropriate information on the display unit 3 based on the data stored in the screen data storage 13. There is no restriction on the information to be displayed on the display unit 3 and examples of the information include appropriate three-dimensional figures.

Upon receipt of the information (coordinate position) on the position touched by the operator and the information on the acting direction and magnitude of the pressing force along the top surface of the touchscreen 2 that are output by the information output unit 14, the display control unit 12 changes the information displayed on the display unit 3 in accordance with the received information. For example, upon receipt of the information on the position touched by the operator, the display control unit 12 recognizes the displayed image corresponding to the touched position and recognizes the recognized displayed image as an image to be moved. Subsequently, upon receipt of the information on the acting direction and magnitude of the pressing force acting along the top surface of the touchscreen 2, the display control unit 12 moves the recognized image to be moved by a predetermined distance in the received acting direction of the pressing force at a speed corresponding to the received magnitude of the pressing force.

As described above, the touchscreen device 1 according to this embodiment having the above-described configuration is capable of not only detecting a pressing force acting vertically on the touchscreen 2 but also detecting a pressing force acting in a direction along the top surface of the touchscreen 2 on the touchscreen 2. Therefore, for example, it is possible to move an image displayed on the touchscreen 2 by first softly touching (pressing) the image to be moved with a finger or the like to bring the image into a movable state and then strongly pressing the finger in a desired direction to move the image in the pressing direction. Thus, it is possible to various manipulate images displayed on the touchscreen 2.

Hereinbefore, an embodiment of the present invention has been described. However, the present invention is not limited to the above-described embodiment and can be implemented in other manners.

For example, the touchscreen device 1 according to the above-described embodiment has the configuration in which the four corners of the touchscreen 2 are respectively supported by the support members 6a, 6b, 6c, 6d, the support members 6a, 6b, 6c, 6d respectively have the pressure sensors 10a, 10b, 10c, 10d on the inclined surfaces thereof, and an acting force acting in a direction along the top surface of touchscreen 2 on the top surface of the touchscreen 2 is detected with the pressure sensors 10a, 10b, 10c, 10d. However, the present invention is not limited to this configuration and may be embodied as a touchscreen device 1' having a configuration as illustrated in FIGS. 5 and 6.

The touchscreen device 1' is configured such that the touchscreen 2 is supported by support members 6a', 6b', 6c', 6d' respectively provided at middle portions of the four sides of the support frame 5 inside the frame of the support frame 5. Each support member 6a', 6b', 6c', 6d' has an inclined surface and is fixed to the support frame 5 with the inclined surface facing inward. On the inclined surfaces of the support members 6a', 6b', 6c', 6d', pressure sensors 10a', 10b', 10c', 10d' are respectively attached.

The touchscreen 2 is held by the support frame 5 with the four sides of the touchscreen 2 respectively in contact with the pressure sensors 10a', 10b', 10c', 10d'. Note that the surface in contact with the touchscreen 2 of each pressure sensor 10a', 10b', 10c', 10d' functions as a sensing surface. The inclined surfaces of the support members 6a', 6b', 6c', 6d' as well as the pressure sensors 10a' 10b', 10c', 10d' have an angle of 45° with respect to the top surface of the touchscreen 2. Pressure data detected by each pressure sensor 10a', 10b', 10c', 10d' is transmitted to the information output unit 14.

Figure 5:
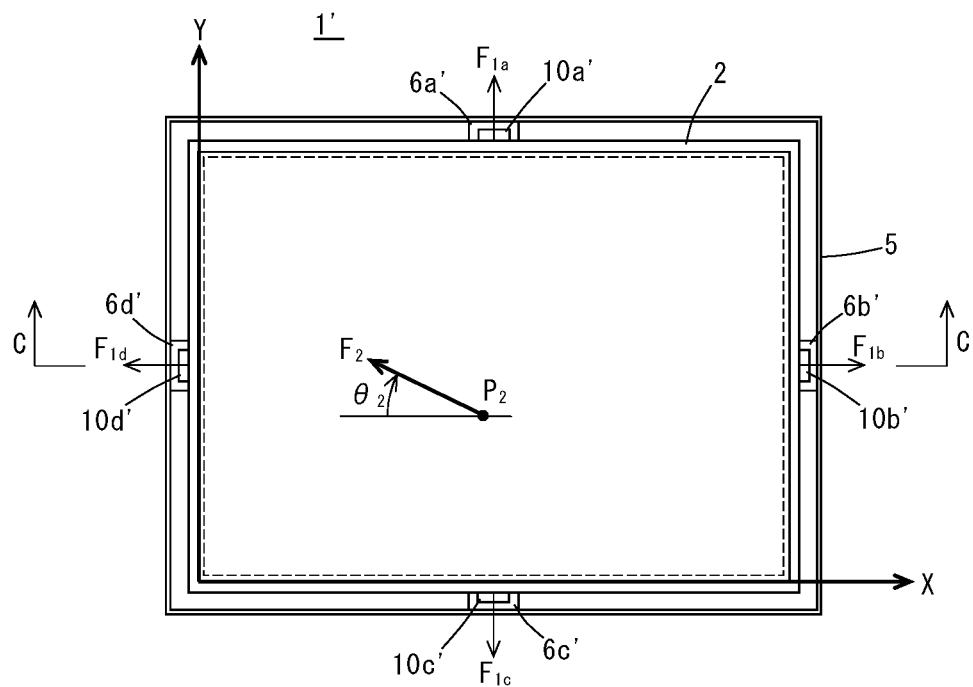
FIG. 5 is a plan view illustrating a touchscreen in another embodiment of the present invention.
Figure 6:
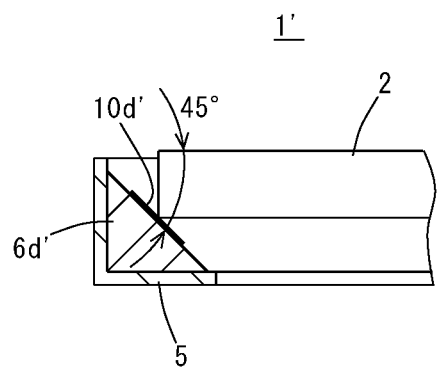
FIG. 6 is an enlarged view of a left edge portion of a sectional view taken along line C-C in FIG. 5.

In the touchscreen device 1' according to this embodiment, if a pressing force $F_2$ acts in the direction indicated by the arrow at a position $P_2$ on the touchscreen 2 as illustrated in FIG. 5, the largest of pressing forces along the top surface of the touchscreen 2 detected by the pressure sensors 10a', 10b', 10c', 10d' will be the pressing force $F_{2d}$ detected by the pressure sensor 10d', followed in order by the pressing force $F_{2a}$ detected by the pressure sensor 10a', the pressing force $F_{2c}$ detected by the pressure sensor 10c', and the pressing force $F_{2b}$ detected by the pressure sensor 10b'.

Similarly to the above-described embodiment, the information output unit 14 compares the pressing forces $F_{2a}$, $F_{2b}$, $F_{2c}$, $F_{2d}$, thereby recognizing the acting direction of the pressing force $F_2$. Further, the information output unit 14 recognizes the sum of the pressing forces $F_{2a}$, $F_{2b}$, $F_{2c}$, $F_{2d}$ as the pressing force $F_2$. The acting direction of the pressing force $F_2$ can be defined by an angle $\theta_2$ with respect to the X-axis. The information output unit 14 outputs information on the recognized acting direction (angle $\theta_2$) and magnitude ($F_2$) of the pressing force $F_2$ to the display control unit 12 in the same manner as in the above-described embodiment.

Thus, the touchscreen device 1' is also capable of not only detecting a pressing force acting vertically on the touchscreen 2 but also detecting a pressing force acting in a direction along the top surface of the touchscreen 2 on the touchscreen 2. Therefore, it is possible to variously manipulate images displayed on the touchscreen 2.

In the above-described embodiments, the pressure sensors 10a, 10b, 10c, 10d and the pressure sensors 10a', 10b', 10c', 10d' are inclined to have an angle of 45° with respect to the top surface of the touchscreen 2. However, the present invention is not limited to this configuration. The pressure sensors 10a, 10b, 10c, 10d and the pressure sensors 10a', 10b', 10c', 10d' may be inclined at any angle as long as they allow for both accurate detection of an acting force acting on the touchscreen 2 and stable support of the touchscreen 2.

In the above-described embodiments, the touchscreen 2 is supported at four points. However, the present invention is not limited to this configuration. The touchscreen 2 can be supported at three or more points and all that is required is to arrange at each support point the pressure sensor such that the pressure sensor is in contact with the touchscreen 2.

In the above-described embodiments, the touchscreen 2 has a rectangular shape. However, the present invention is not limited to this configuration. The touchscreen 2 may have a different shape, such as a circular shape or a polygonal shape.

In the above-described embodiments, by way of example, the touchscreen 2 is of the self-capacitance detection type. However, the present invention is not limited to this configuration. The touchscreen 2 may be of the mutual-capacitance detection type or may comprise a resistive touchscreen, an optical touchscreen, or a sonic touchscreen. Otherwise, the touchscreen 2 may comprise any suitable conventionally known touchscreen, such as a capacitive touch key or the like.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Touchscreen device
2 Touchscreen
3 Display unit
4 Input unit
5 Support frame
6 Support member
10 Pressure sensor
11 Display controller
12 Display control unit
13 Screen data storage
14 Information output unit
15 Information processing unit

The invention claimed is:

1. A touchscreen device comprising:
a touchscreen having a plate shape;
support parts supporting at least three points of a periphery of the touchscreen; and
an information output unit outputting, to outside, information corresponding to an external force acting on the touchscreen,
each of the support parts having a pressure sensor arranged such that a sensing surface for pressure detection thereof is in contact with a lower end edge of the periphery of the touchscreen and the sensing surface thereof is inclined at a predetermined angle with respect to a planar surface of the touchscreen,
the information output unit being configured to recognize, based on detected values detected by the pressure sensors, an acting direction along the planer surface of the touchscreen of the external force acting on the touchscreen and output, to the outside, information on the acting direction and positional information detected by the touchscreen for a position on the touchscreen where the external force is acting.

2. The touchscreen device according to claim 1, wherein the touchscreen has a rectangular shape and the support parts are configured to respectively support four sides of the periphery of the touchscreen.

3. The touchscreen device according to claim 2, wherein each of the pressure sensors is arranged such that the sensing surface thereof is in contact with the touchscreen at an angle of 45° with respect to the planar surface of the touchscreen.

4. The touchscreen device according to claim 1, wherein the touchscreen has a rectangular shape and the support parts are configured to respectively support four corners of the periphery of the touchscreen.

5. The touchscreen device according to claim 4, wherein each of the pressure sensors is arranged such that the sensing surface thereof is in contact with the touchscreen at an angle of 45° with respect to the planar surface of the touchscreen.

6. The touchscreen device according to claim 1 wherein each of the pressure sensors is arranged such that the sensing surface thereof is in contact with the touchscreen at an angle of 45° with respect to the planar surface of the touchscreen.

* * * * *